United States Patent [19]
Covington

[11] Patent Number: 5,405,527
[45] Date of Patent: Apr. 11, 1995

[54] ANTI-DRAINBACK/PRESSURE-RELIEVED FILTER CARTRIDGES FOR LUBRICATING OIL

[75] Inventor: Edward A. Covington, Gastonia, N.C.

[73] Assignee: Dana Corporation, Toledo, Ohio

[21] Appl. No.: 201,505

[22] Filed: Feb. 24, 1994

[51] Int. Cl.$^6$ .................................................. B01D 27/10
[52] U.S. Cl. ................................... 210/130; 210/136; 210/440; 210/DIG. 17
[58] Field of Search ............... 210/130, 136, 440, 443, 210/444, DIG. 17

[56] References Cited

U.S. PATENT DOCUMENTS

| | | | |
|---|---|---|---|
| 3,231,089 | 1/1966 | Thornton | 210/130 |
| 3,305,095 | 2/1967 | Hathaway | 210/130 |
| 3,332,554 | 7/1967 | Humbert, Jr. | 210/130 |
| 3,567,023 | 3/1971 | Buckman et al. | 210/130 |
| 3,785,491 | 1/1974 | Dudinec et al. | 210/130 |
| 4,144,168 | 3/1979 | Thornton | 210/130 |
| 4,732,678 | 3/1988 | Humbert, Jr. | 210/440 |
| 4,872,976 | 10/1989 | Cudaback | 210/130 |
| 5,284,579 | 2/1994 | Covington | 210/130 |

Primary Examiner—Matthew O. Savage
Attorney, Agent, or Firm—Millen, White, Zelano & Branigan

[57] ABSTRACT

Filter cartridges having annular filter elements retained within housings include a cylindrical valve support on which an annular valve is mounted. The annular valve has a valve skirt and a valve sleeve. During normal operation, the valve skirt deflects, allowing lubricating oil to flow to and through the filter element. When the filter element clogs, the valve sleeve deflects, uncovering openings through the valve support which the valve sleeve normally blocks. Lubricating oil then flows through the openings in the valve support bypassing the clogged filter. In accordance with one embodiment of the filter cartridge, the filter element, valve and valve support are held in axial abutment within the filter housing by a coil spring. In accordance with preferred embodiment of the filter cartridge, the filter element valve and valve support are retained in the filter housing by adhesive.

11 Claims, 10 Drawing Sheets

ANTI-DRAINBACK/PRESSURE-RELIEVED FILTER CARTRIDGES FOR LUBRICATING OIL

FIELD OF THE INVENTION

The present invention relates to improvements in anti-drainback/pressure-relieved filter cartridges for lubricating oil. More particularly, the present invention relates to improvements in valve members for such filter cartridges and in configurations for retaining annular filter elements and valves in housings of filter cartridges.

BACKGROUND ART

Annular filter elements are mounted in filter housings to form replaceable filter cartridges which are threadably mounted on internal combustion engines. The cartridges are generally known as "spin-on filters" because they are threadably mountable and removable. If a customer follows the recommended procedures for changing the filter cartridge when lubricating oil is changed, then it is unusual for the filter to clog; however, if the customer fails to change the filter cartridge, or if the lubricating oil becomes contaminated for some other reason, the filter can become clogged and either block or minimize flow of lubricating oil to the engine. If this happens, an engine can be destroyed or seriously damaged.

In order to avoid or at least minimize damage, filter cartridges have been configured to allow oil to bypass filter elements in the cartridges if the filter elements become clogged. The engine is, therefore, supplied with at least unfiltered lubricant rather than either no lubricant at all or insufficient lubricant.

Millions of these filter cartridges are manufactured every year, and millions are disposed of. Since these filter cartridges are disposable, reduction in their cost is highly desirable. One cost reduction approach is to reduce the number of metal parts and the crimping, welding and fastening procedures associated therewith by replacing metal components with the molded plastic components. When this is done, molded plastic components must be configured and arranged so as not to compromise the effective operation of the filter cartridges.

SUMMARY OF THE INVENTION

It is a feature of the present invention to provide a new and improved configuration for cartridges to filter lubricating oil.

The present invention is directed to a lubricating oil filter cartridge having a housing with an annular filter element therein. The housing includes an end plate with inlet openings therethrough for allowing lubricating oil to enter the filter element axially and a central outlet for allowing filtered oil to pass from the cartridge to the engine to which the cartridge is connected. In accordance with the present improvement to the filter cartridge, an annular valve support is positioned around the outlet opening and projects into a hollow core of the annular filter element. The valve support has a cylindrical wall with openings therethrough, a first end and a second end, the first end being in abutment with the end plate of the housing. An annular valve with a laterally extending valve skirt is disposed between the end of the annular filter element and the inlet openings through the end plate. The valve skirt flexes to allow lubricating oil to flow therepast when the lubricating oil is being circulated into the inlets and blocks flow of lubricating oil back out of the inlet when the lubricating oil is not being circulated. The valve member also includes an axially extending valve sleeve extending over the openings through the valve support for blocking the openings under normal operating conditions and for uncovering the openings under bypass operating conditions which occur when the filter element is clogged. The valve skirt and valve sleeve are connected by a bight portion in which the second end of the valve support is received. The annular filter element rests against the valve at an area disposed between the valve skirt and valve sleeve.

In a specific aspect of the invention, the valve member is molded of a flexible synthetic rubber-type material such as nitrile rubber or silicon rubber while the valve support is molded of a heat-resistant nylon material.

Upon further study of the specification and appended claims, further objects and advantages of this invention will become apparent to those skilled in the art.

BRIEF DESCRIPTION OF THE DRAWINGS

Various other features and attendant advantages of the present invention will be more fully appreciated as the same becomes better understood when considered in conjunction with the accompanying drawings, in which like reference characters designate the same or similar parts throughout the several views, and wherein.

DETAILED DESCRIPTION

First Embodiment Of the Invention—FIGS. 1-7

Figure 1:
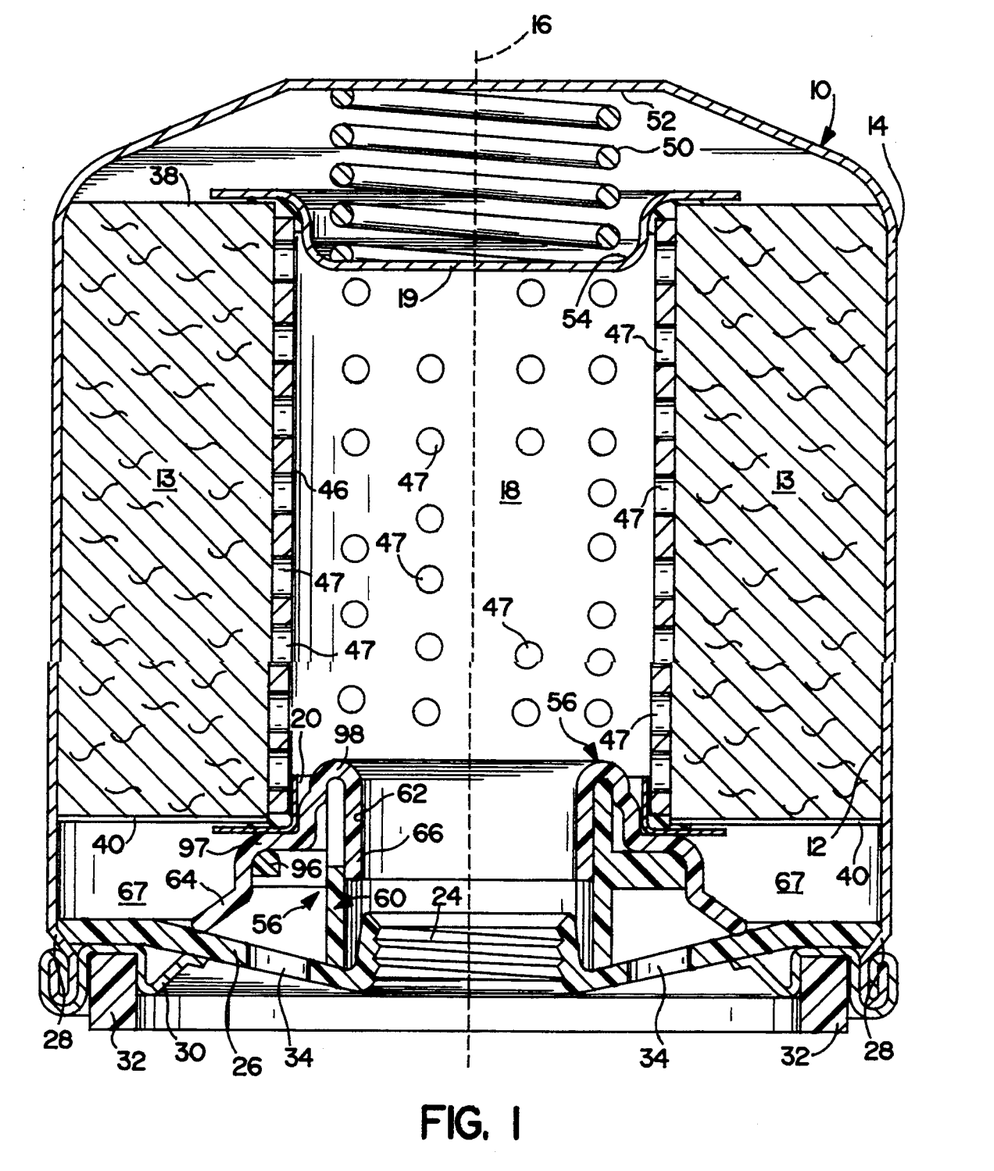
FIG. 1 is a side elevational view of a lubricating oil filter cartridge configured in accordance with the principles of the instant invention, showing the components of the cartridge in an anti-drainback mode.

Referring now to FIG. 1, there is shown a lubricating oil filter cartridge 10 configured as a first embodiment of the present invention. Cartridge 10 comprises an annular filter element 12 made of a conventional, pleated paper filter medium 13, or some other conventional filter material, contained within a cylindrical housing 14. The annular filter element 12 is concentric with respect to an axis 16 of the cartridge 10 and has a central cavity 18.

The annular filter element 12 has at a first end a closed dished plate 19 which is sealed by plastisol, epoxy or the like to the first end of the filter element. An annular flanged sleeve 20 is adhered to plastisol, epoxy, or the like to a second end of the filter element 13 so that the hollow core 18 of the filter element is open proximate its second end. Flanged sleeve 20 is aligned with a threaded central opening 24 in a steel end plate 26, which steel end plate is retained in the housing 14 by a double seam 28. The double seam 28 also supports an annular, resilient mounting ring 30 which retains an annular, axially acting seal 32. Disposed through the steel end plate 26, around the central opening 24 are a plurality of oil inlet openings 34.

The filter element 12 has a first annular end 38 which is closed and a second annular end 40 which has openings therethrough so as to allow lubricating oil to flow between the folds of the paper filter medium 13 longitudinally and then radially out of the filter paper into the hollow cavity 18. The filter element 12 is stiffened by a cylindrical metal tube 46 with a multiplicity of holes 47 which directly connect the paper filter medium 13 with the hollow core 18.

In accordance with the principles of the present invention, the filter element 12 is biased by a coil spring 50 which, at a first end, abuts a flat portion 52 of the housing 14 and, at a second end, abuts an indented portion 54 of dished plate 19 so as to axially bias the filter element 12 toward a valve assembly 56 comprised of a valve support 60 and an anti-drainback/pressure relief valve 62. Valve 62 includes an annular, laterally extending valve skirt portion 64 and an annular, axially extending valve sleeve 66. Since the annular filter element 12 rests on the valve assembly 56, a space 67 is provided between the second end 40 of the filter element and the end plate 26. As will be explained hereinafter, the valve 62 functions in an anti-drainback mode, in a normal operating mode and in a bypass mode.

When in the FIG. 1 position, the valve skirt 64 and valve sleeve 66 block flow of lubricating oil out of the filter cartridge 10 by preventing lubricating oil from flowing through inlet opening 34 in end plate 26. This anti-drainback feature retains oil in the engine (not shown) with which the filter cartridge 10 is used when the engine is not running, ensuring lubricating oil is in the engine at start-up.

Figure 2:
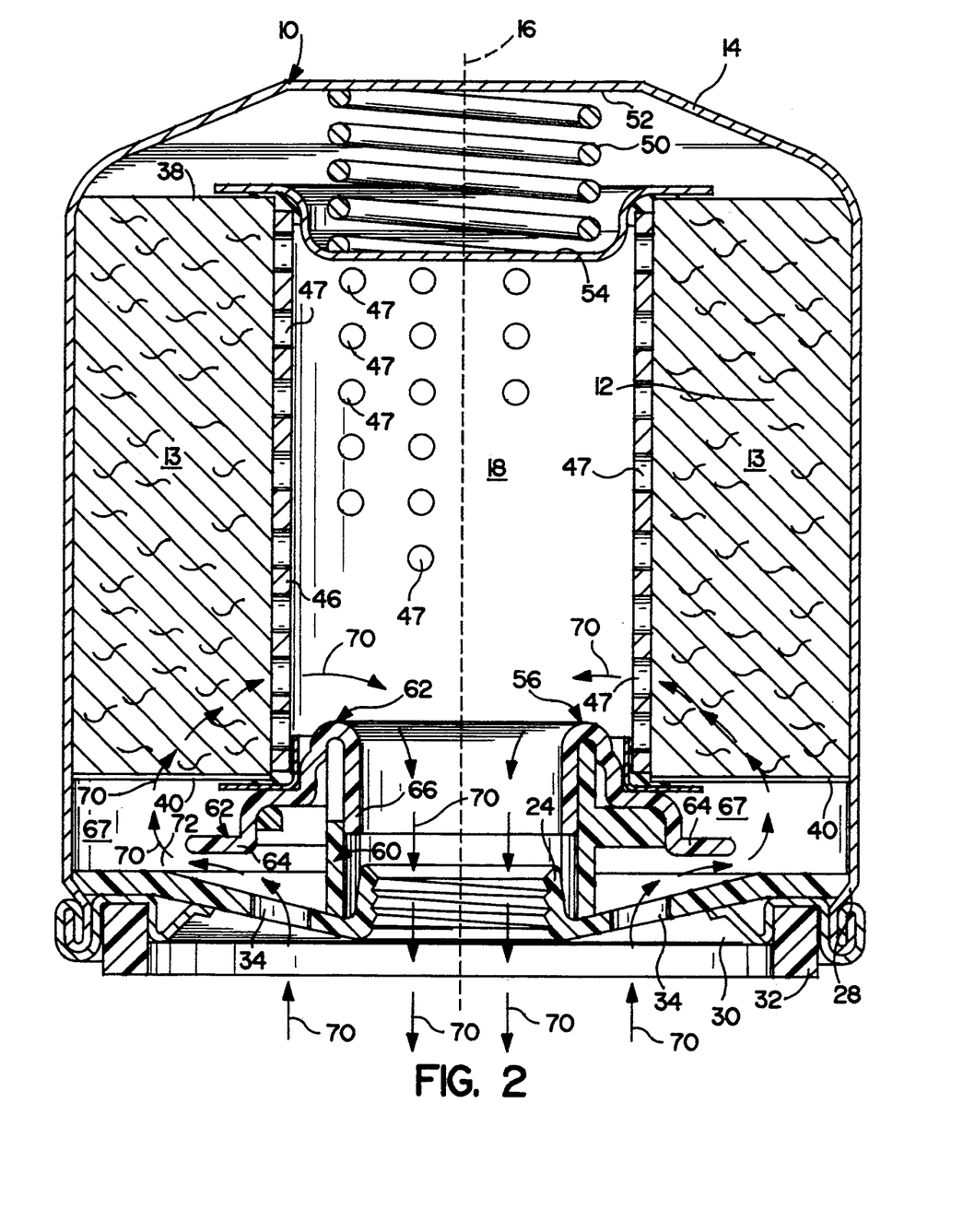
FIG. 2 is a view similar to FIG. 1, illustrating operation of the filter cartridge of FIG. 1 during the normal oil flow mode.

Referring now to FIG. 2, where the position of the valve 62 in the normal operating mode is shown, it is seen that the annular valve skirt 64 is pivoted up to extend radially with respect to the axis 16, thus allowing lubricating oil to flow as illustrated by the arrows 70. As is seen in FIG. 2, the lubricating oil 70 flows into the filter cartridge 10 through inlet openings 34 in end plate 26 and then through a gap 72 between the end plate and the annular valve skirt 64. The lubricating oil then flows axially between the pleats of the filter medium paper 13 and radially through the holes 47 in the center tube 46 into the hollow core 18 of the filter element 12. From the hollow core 18, the now-filtered lubricating oil passes through the threaded outlet 24 in end plate 26 and back to the engine (not shown).

Figure 3:
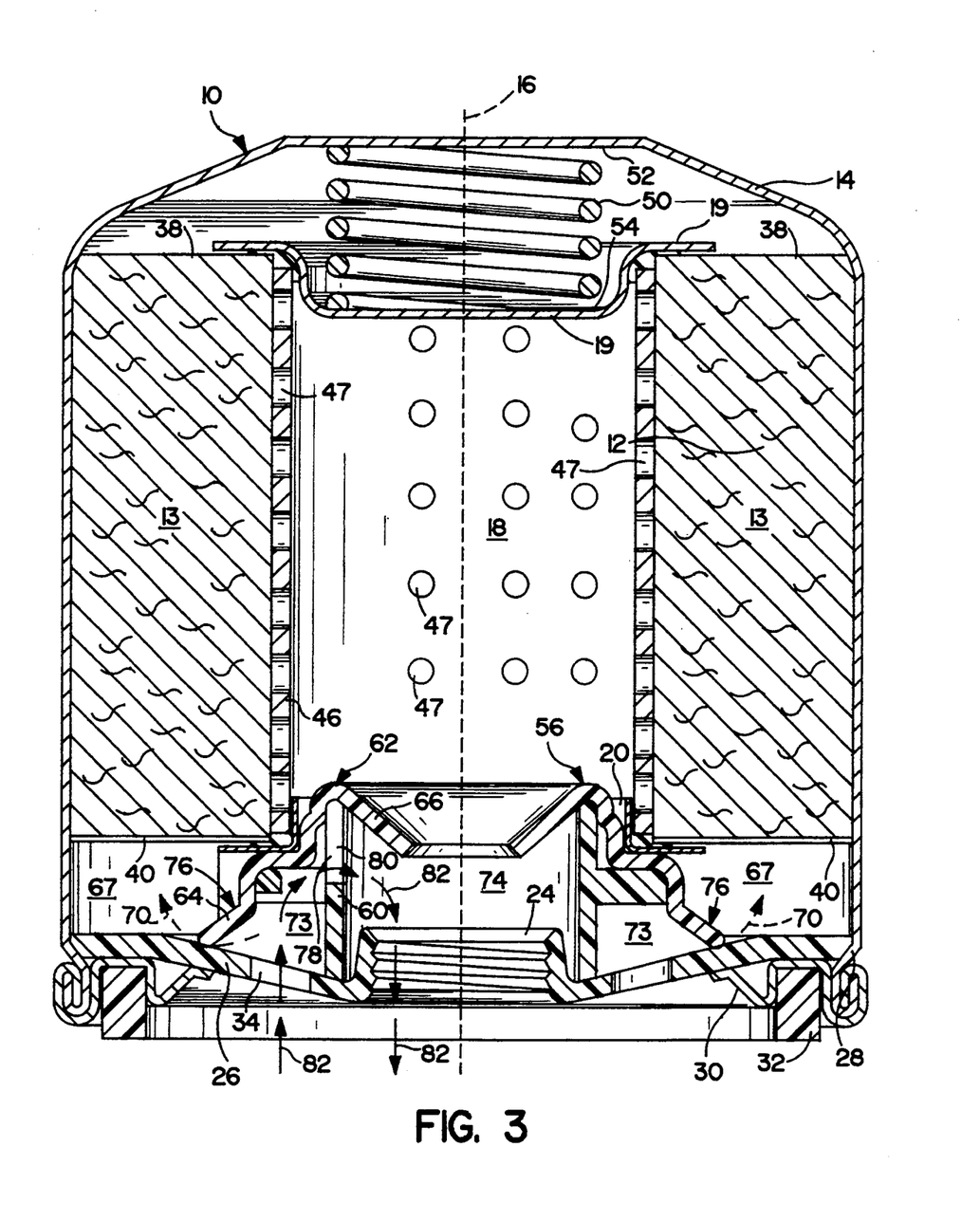
FIG. 3 is a view similar to FIGS. 1 and 2, but illustrating operation of the filter cartridge in a bypass mode after a filter element within the cartridge has become clogged.

Referring now to FIG. 3, as the filter paper 13 becomes clogged, the pressure differential drops between the space 73 outside the valve support 60 and the space 74 inside the valve support, causing the valve sleeve 66 to crack open. Once the valve sleeve 66 cracks open, the majority of the lubricating oil starts to flow through the openings 80 in the valve support 60, which causes the valve sleeve to open rapidly to its FIG. 3 position. The valve skirt 64 then tends to drop and narrow the gap 72 so that most of the lubricating oil, but not usually all, bypasses the filter paper medium 13 and flows through opening 80 in the valve support 60. As clogging of the filter medium 13 increases, the amount of lubricating oil that passes therethrough continues to decrease further, narrowing the gap 72. If the gap 72 completely closes, then all lubricating oil flows through openings 80. When the valve 62 is in the bypass mode, the lubricating oil flows in the direction of arrows 82 through openings 80 in valve support 60 and out of the threaded outlet 24 in the end plate 26 so as to return to the engine to keep the engine lubricated even though the filter element 12 is clogged.

In order to have the valve arrangement 56 function effectively, as is shown in FIGS. 1-3, the valve support 60 and valve 62 preferably have the configurations shown in FIGS. 4 and 5 and FIGS. 6 and 7, respectively.

Figure 4:
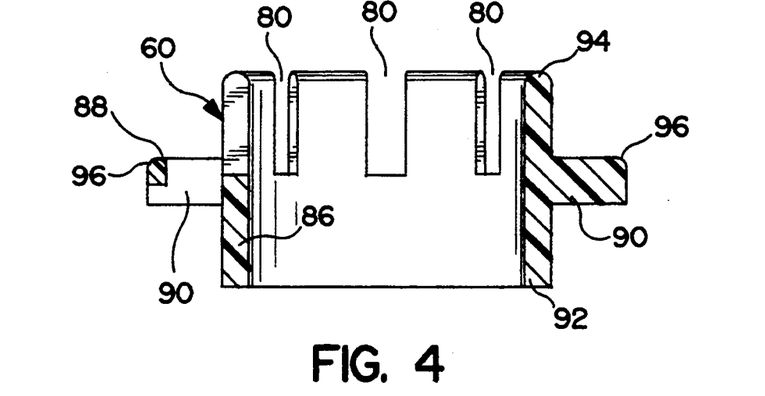
FIG. 4 is a side elevation of a valve support element.
Figure 5:
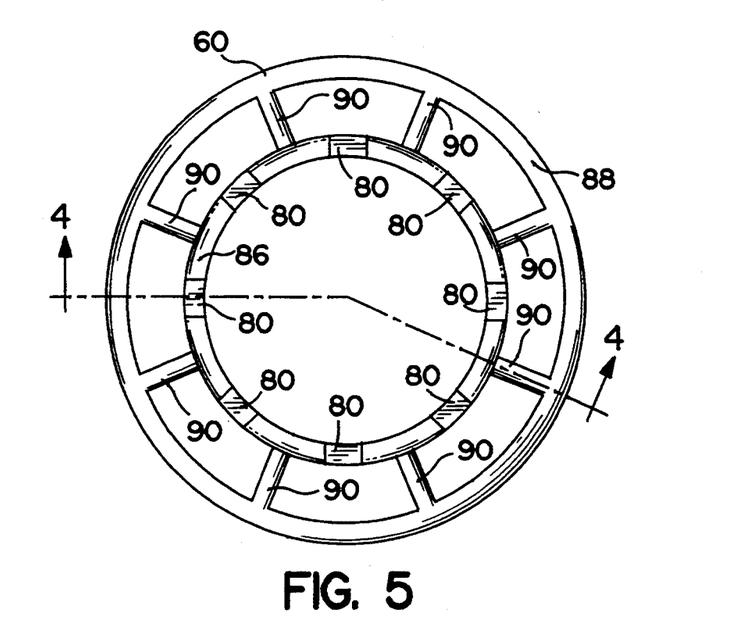
FIG. 5 is a top view of the valve support element of FIG. 4.

Referring now to FIGS. 4 and 5, it is seen that the valve support 60 includes a cylindrical barrel portion 86 in which the openings 80 are configured as a plurality of longitudinally extending slots. Alternatively, the openings 80 could be circular holes (not shown). A rim 88 is supported on the barrel portion 86 by an array of spokes 90, each of which spokes extends from the barrel portion at locations between the openings 80. When the valve support 60 is mounted in the housing 14, a bottom end 92 of the barrel portion 86 is urged by coil spring 50 against the end plate 26 of the housing 11 with an upper end 94 of the barrel portion and the upper surface 96 of the rim 88 supporting the valve 62 against the flanged portion of the annular flanged sleeve 20 (see FIGS. 1-3). The spokes 90 support the filter element 12 and carry the load exerted by the spring 50 (see FIGS. 1-3).

Figure 6:
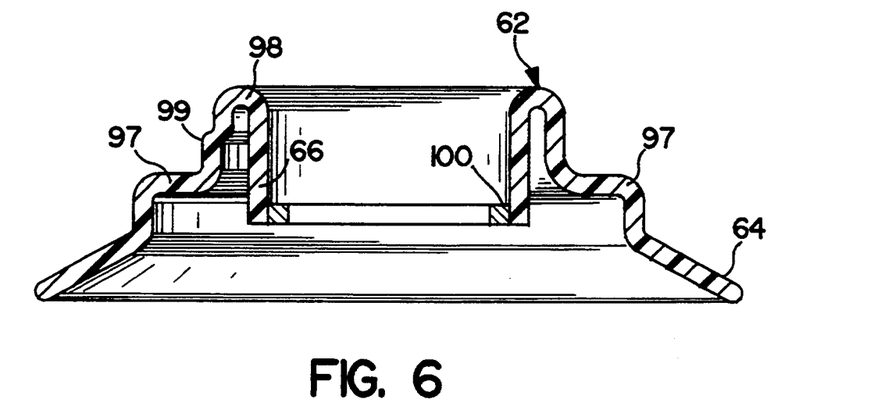
FIG. 6 is a side elevation illustrating an anti-drainback/pressure relief valve which is mountable on the valve support of FIGS. 4 and 5.
Figure 7:
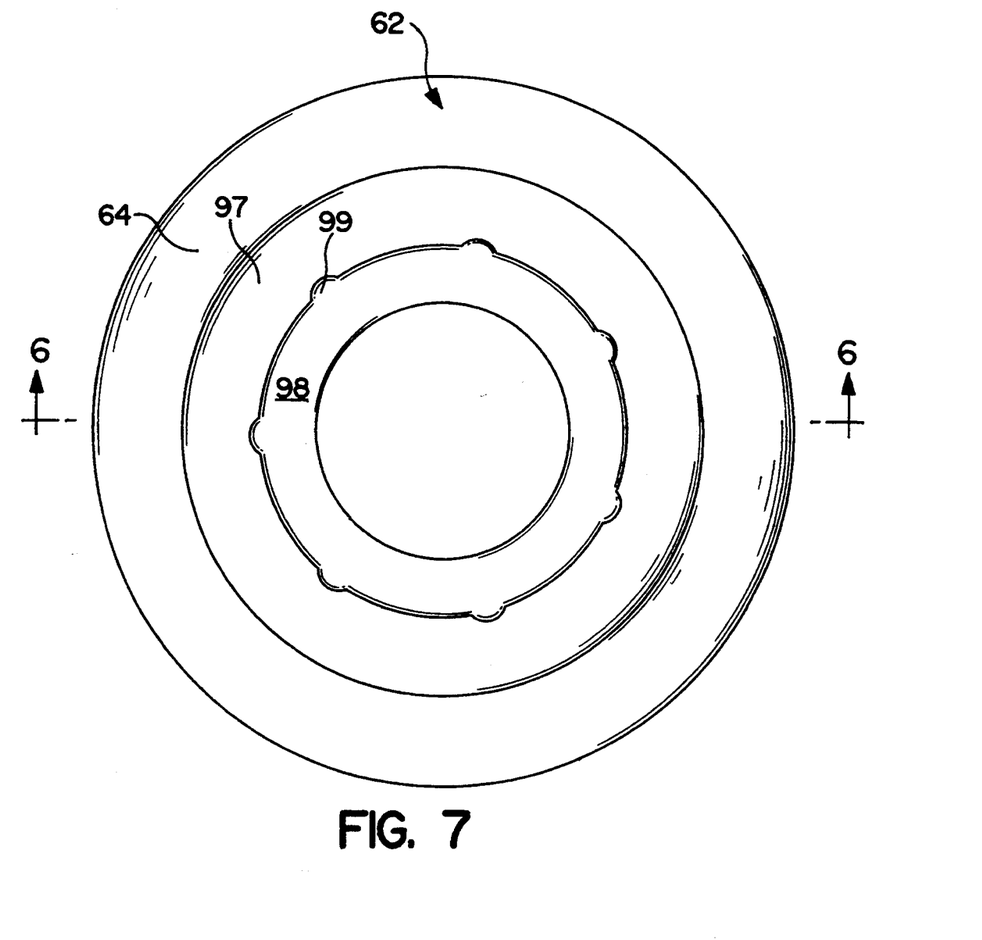
FIG. 7 is a top view of the valve of FIG. 6.

Referring now to FIGS. 6 and 7 where the anti-drainback/pressure relief valve 62 is shown in isolation, it is seen that the laterally extending valve skirt 64 extends from a step portion 97 which, in turn, is connected to a U-shaped bight portion 98. The bight portion 98 includes a plurality of centering nibs 99 for centering the annular filter element (see FIGS. 1-3). The second end 94 of the barrel 86 (see FIG. 4) is received in the bight portion 98 and serves as a support on which the valve sleeve 66 pivots as the valve 60 buckles when assuming the bypass mode of FIG. 3.

To stiffen the valve sleeve 66, a reinforcing rib or ring 100 may be positioned proximate the free end of the valve sleeve.

Preferably, the valve support 60 is molded from a relatively rigid nylon-type material which is heat resistant, while the valve 62 is molded from a flexible material such as nitrile rubber or silicone rubber.

Preferred Embodiment of the Invention—FIGS. 8-16

Figure 8:
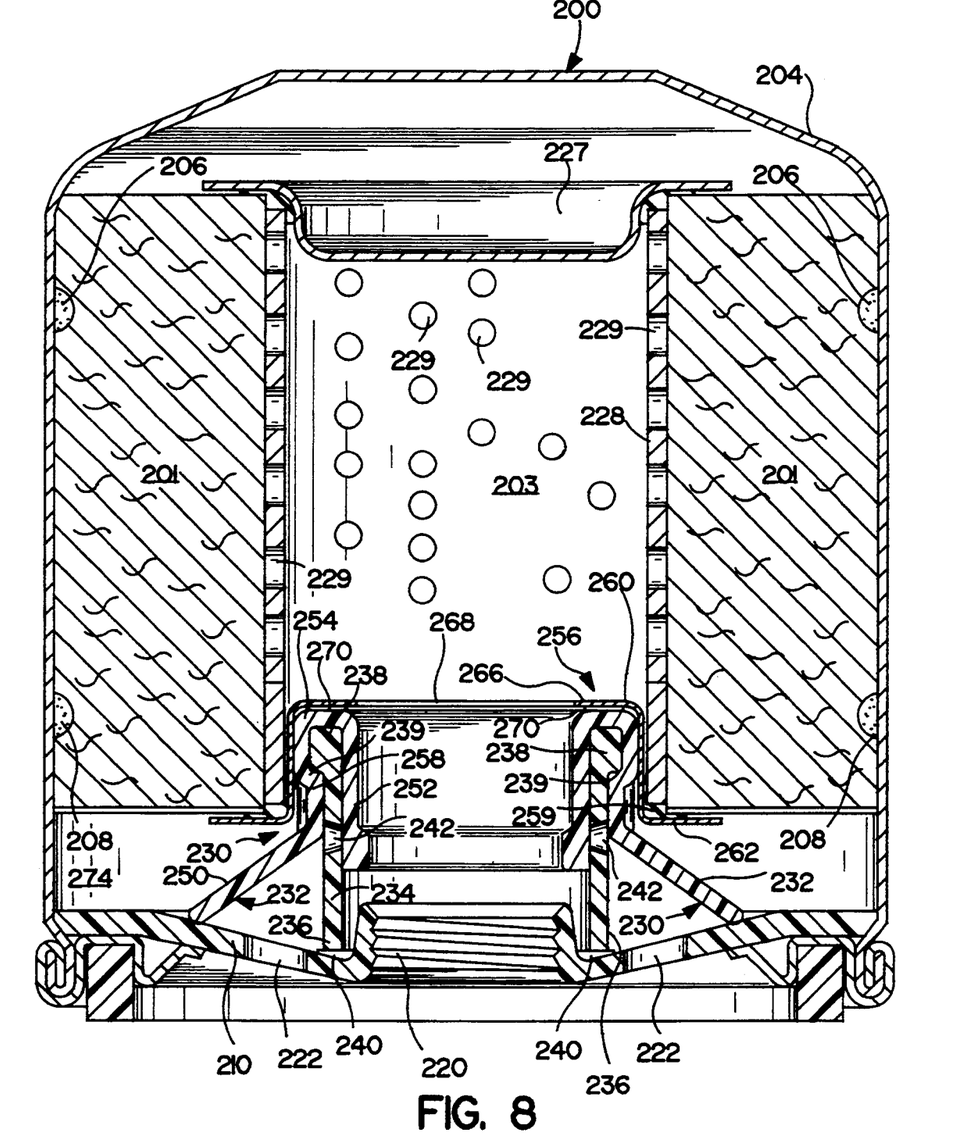
FIG. 8 is a side elevational view of a preferred embodiment of the filter cartridge of the instant invention when in an anti-drainback mode.

Referring now to FIG. 8, there is shown a lubricating oil filter canister 200 for lubricating oil in which a filter paper medium 201, configured as an annular filter element 202 with a hollow core 203, is retained within a housing 204 by beads of adhesive 206 and 208. In the preferred embodiment of FIGS. 8-16 there is no need for a coil spring such as the coil spring 50 of FIG. 1-3. The beads of adhesive 206 and 208 may be of epoxy, plastisol, or another suitable material and may be configured as rings, spaced daubs, spirals or short arcs which are applied axially or radially on the outer cylindrical surface of the annular filter element 202.

The housing 204 has a steel end plate 210 which is similar to the end plate 26 of FIGS. 1-3, the end plate 210 having an internally threaded outlet 220 and an array of inlet openings 222. The housing 204, end plate 210 and annular filter element 202 are substantially the same as the corresponding structure of FIGS. 1-3. At the first end of the filter element 202, a dished end plate 227 is secured with a layer of plastisol or the like in order to close the hollow core 203. A cylindrical metal tube 228 with circular openings 229 stiffens the annular filter element 202.

Disposed between the end plate 210 and filter 202 is a valve assembly and filter support structure 230 which includes a valve 232 and a valve support 234. Valve support 234 is in the form of a collar or barrel and includes a first end 236 and a second end 238, the second end having a shoulder 239 facing away from the second end. The first end is optionally secured to the end plate 210 by a layer of epoxy or plastisol adhesive 240 which retains the valve support 234 in coaxial relationship with the internally threaded outlet 220. The wall of the valve support 234 has openings 242 therethrough which provide a fluid flow path through the valve support.

As with the arrangement of FIGS. 1-3, the valve 232 includes a laterally extending, annular valve skirt 250 and an axially extending, annular valve sleeve 252. The valve skirt and valve sleeve 250 and 252, respectively, are joined by an annular bight portion 254 which has an annular outer surface 256. The bight portion 254 includes a shoulder 258 which engages the complimentary shoulder 239 on the upper end 238 of the support 234 to lock the valve 232 to the valve support.

Adhered to the bottom of filter element 202 by a layer of plastisol 259 is an annular retaining flange 260. A first radially extending portion 262 of the retaining flange 260 is adhered to the bottom of the filter element 202, and an axially extending portion 264 of the retaining flange is adhered to the cylindrical metal tube 228 of the filter element 202. A second radially extending portion 266 of the retaining flange 260 having an annular opening 268 is optionally secured by a layer of adhesive 270 to the outer surface 256 of the valve 232.

In operation, the valve assembly 230 functions in a manner substantially identical to the valve assembly 56 of FIGS. 1-3. When the engine to which the lubricating oil filter cartridge 200 is attached is not operating, the valve skirt 250 and valve sleeve 252 are in the FIG. 8 position so as to block flow of lubricating oil out of the bypass openings 242 in the valve support 234 and the inlet openings 222 in the end plate 210 of the housing 204.

Figure 9:
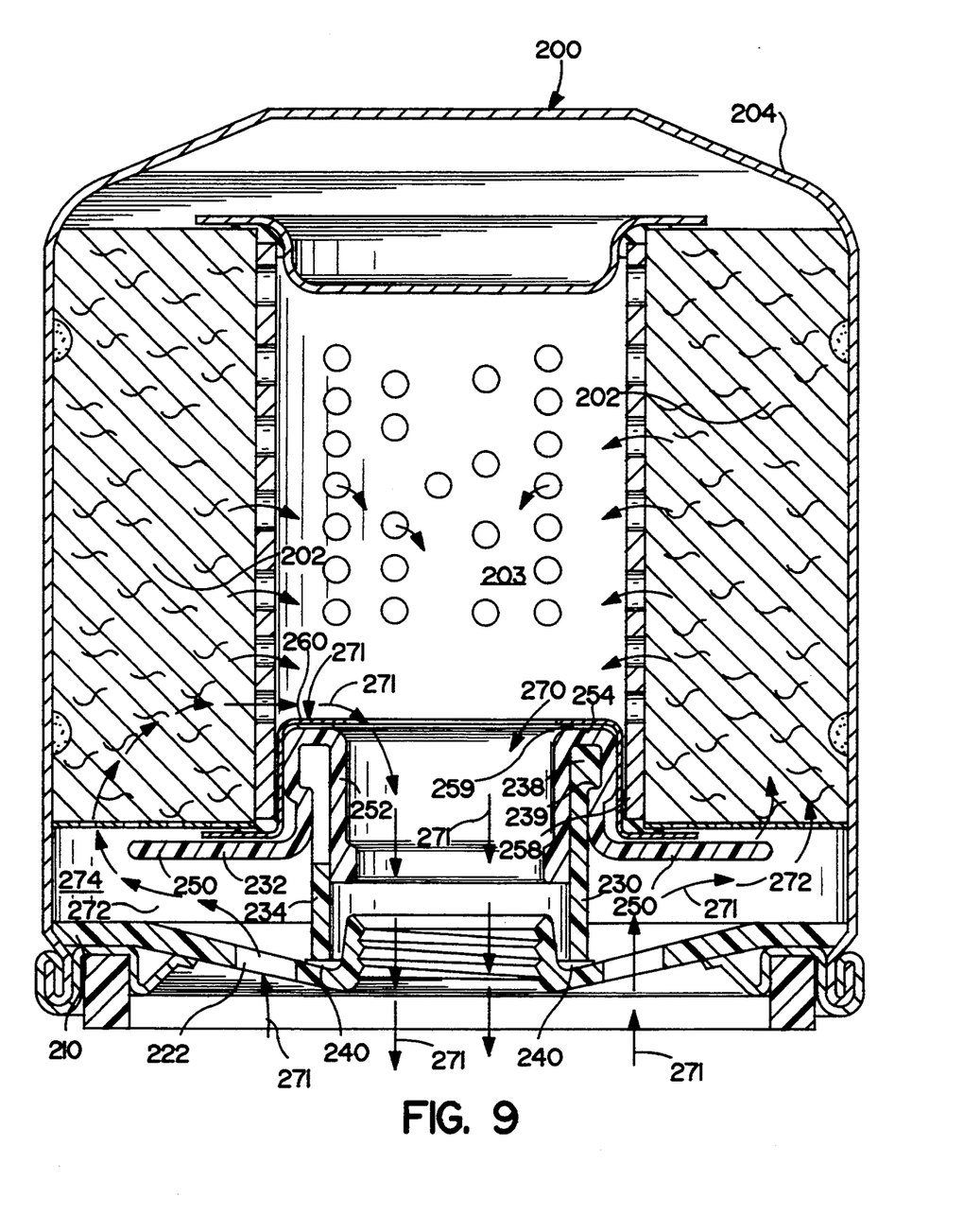
FIG. 9 is a side view similar to FIG. 8 but showing the filter cartridge during the normal oil flow mode.

Referring now to FIG. 9, during normal flow, lubricating oil follows the direction of arrows 271 through the inlet openings 222 in end plate 210 applying sufficient pressure to the valve skirt 250 to deflect the valve skirt away from the end plate 210 and open a gap 272. The oil passes through the gap 272 and through filter element 202 into the central core 203 of the filter element via the circular openings 229 in the cylindrical metal tube 228. The filtered lubricating oil then flows out of threaded outlet 220 to the engine.

Figure 10:
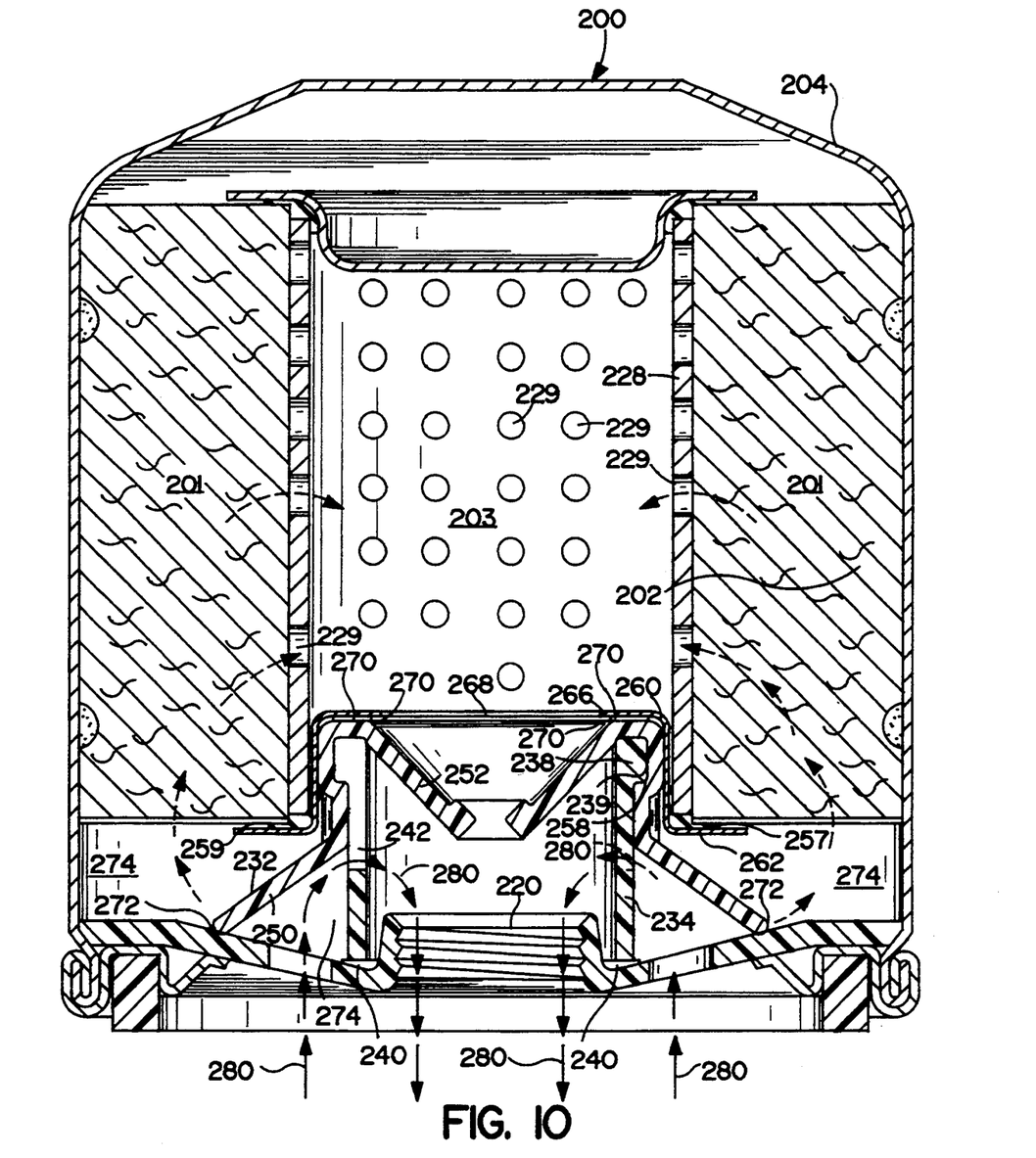
FIG. 10 is a view similar to FIGS. 8 and 9 but showing the lubricating oil cartridge in a bypass mode.

Referring now to FIG. 10, as the filter element 202 becomes clogged, the pressure differential drops between the space 274 outside the valve support 234 and the space 276 inside the valve support, causing the valve sleeve 252 to crack open. Once the valve sleeve 252 cracks open, the majority of the lubricating oil tends to flow through the openings 242 in the valve support 234, which causes the valve sleeve to open rapidly to the FIG. 10 position. The valve skirt 250 then begins to close, narrowing the gap 272 so that most of the lubricating oil, but not usually all, bypasses the filter paper medium 201 and flows through the openings 242 in the valve support 234. As the filter paper medium 201 becomes increasingly clogged, the amount of lubricating oil that passes therethrough continues to decrease, narrowing the gap 272. If the gap 272 completely closes, then all lubricating oil flows through openings 242 in the valve support 234. As with the first embodiment of FIGS. 1—3, the lubricating oil follows the path of arrows 280 into the hollow center 276 of the valve support 234 and out of the threaded outlet 220 in end plate 210 so as to keep the engine (not shown) supplied with lubricant.

Figure 11:
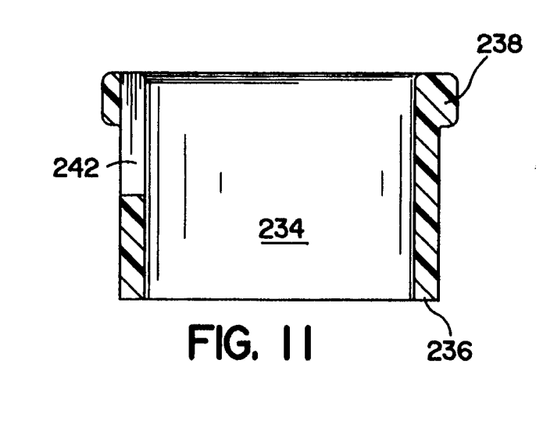
FIG. 11 is a side view of a valve support used with the lubricating oil filter cartridge of FIGS. 8–10.
Figure 12:
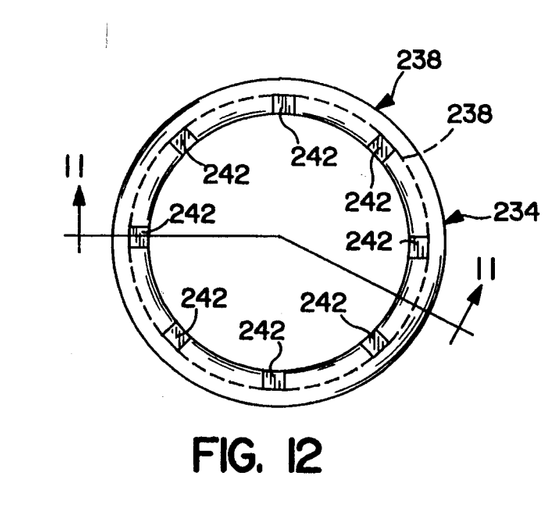
FIG. 12 is a top view of the valve support of FIG. 11.

In FIGS. 11 and 12, a first configuration of the valve support 234 is shown. This configuration is used in the illustration of FIGS. 9 and 10 in which the openings 242 through the wall of the valve support 234 are configured as a plurality of axially extending slots, spaced from the bottom end 236 of the valve support and extending axially through the top end 238 of the valve support.

Figure 13:
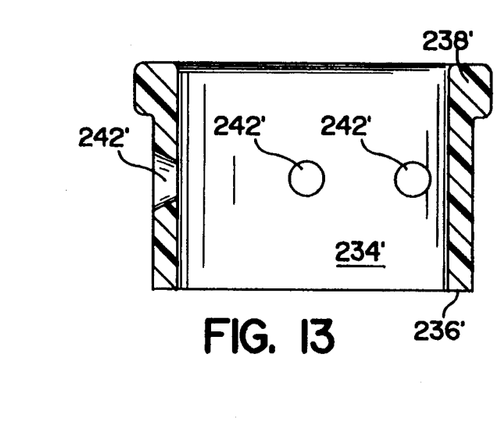
FIG. 13 is a side elevation of an alternative valve support.
Figure 14:
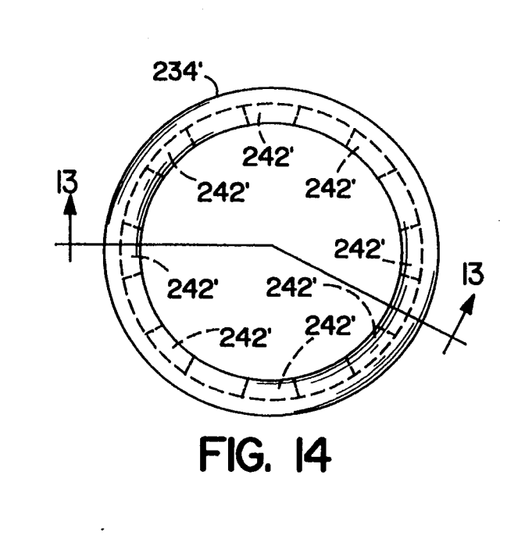
FIG. 14 is a top view of the alternative valve support of FIG. 13.

FIGS. 13 and 14 illustrate a second configuration of the valve support 234'. In the valve support 234', the openings 242' through the wall of the support are circular ports which are spaced from both the bottom end 236' and top end 238 $\propto$ of the valve support.

Figure 15:
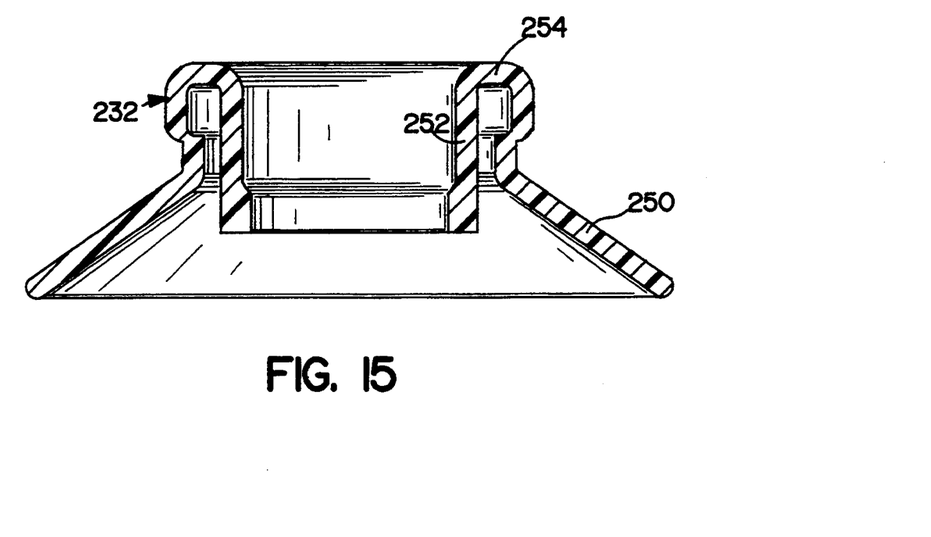
FIG. 15 is a side view of an anti-drainback/pressure relief valve which is mountable on the valve support of FIGS. 11 and 12 or FIGS. 13 and 14.
Figure 16:
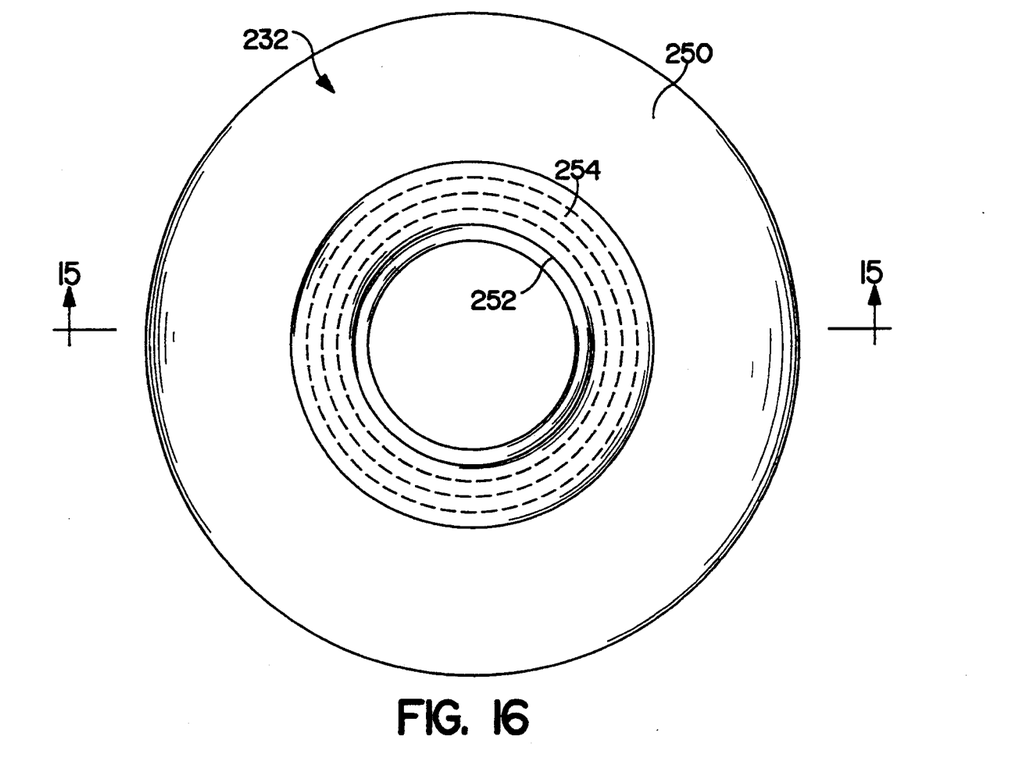
FIG. 16 is a top view of the anti-drainback/pressure relief valve of FIG. 15.

The valve 232 shown in FIGS. 15 and 16 is a separate element molded apart from the valve supports 234 or 234', and as seen in FIGS. 8, 9, and 10, may be used with either valve support without substantial structural modification.

Preferably, the valve supports 234 and 234' are molded from a relatively rigid nylon-type material which is heat-resistant, while the valve 232 is molded from a flexible material such as nitrile rubber or silicon rubber.

By utilizing the molded valve 232 and either the molded valve support 234 or 234', a substantial reduction in the number of metal parts needed to configure the filter cartridge 200 occurs which saves considerable production expense.

From the foregoing description, one skilled in the art can easily ascertain the essential characteristics of this invention and, without departing from the spirit and scope thereof, can make various changes and modifications of the invention to adapt it to various usages and conditions.

What is claimed is:

1. In a lubricating oil filter cartridge, a housing with an annular filter element therein, the annular filter element having a hollow core, the housing including an end plate at an open end thereof with inlet openings therethrough for allowing lubricating oil to enter the filter element axially and a central outlet for allowing filtered oil to pass out of the filter element, the improvement comprising:

an annular valve support disposed around the outlet opening and projecting into the hollow core through an open end of said filter element, the valve support having a cylindrical wall with openings therethrough, a first end and a second end, wherein the first end is in abutment with the end plate of the housing; and an annular valve having a laterally extending valve skirt disposed between the open end of the annular filter element and the inlet openings through the end plate, the valve skirt flexing to allow lubricating oil to flow therepast when the lubricating oil is being pumped into the inlet and blocking flow of lubricating oil back out of the inlet when the lubricating oil is not being pumped, the valve member also including an axially extending sleeve portion extending over the openings through the cylindrical wall of said valve support for blocking the openings under normal operating conditions and for uncovering the openings under bypass operating conditions when the filter element is clogged, the valve skirt and valve sleeve being connected by a bight portion in which the second end of the valve support is received, the open end of said annular filter element including an annular flange resting against the valve at an area disposed between the valve skirt and valve sleeve.

2. The improvement of claim 1, wherein a spring is disposed between a closed end of the housing and a closed end of the filter element for applying an axial force to the filter element to urge the annular flange against the valve member.

3. The improvement of claim 2, wherein the valve support includes a radially extending rim against which a radially extending portion of the valve is urged by the annular flange.

4. The improvement of claim 1, wherein the annular filter element is secured in the housing by adhesive.

5. The improvement of claim 4, wherein the adhesive is disposed between the first end of the valve support and the end plate and between the annular flange and the valve to secure the filter element, valve and valve support within the housing.

6. The improvement of claim 4, wherein the adhesive is disposed between an outer cylindrical surface of the annular filter element and an inner cylindrical wall of the housing.

7. The improvement of claim 6, wherein the annular valve is a unitary member of molded flexible material.

8. The improvement of claim 1, wherein the annular valve support is a unitary member of molded plastic material.

9. The improvement of claim 8, wherein the annular valve support is molded of a relatively rigid, heat resistant, nylon material.

10. The improvement of claim 1, wherein the annular valve is molded of a flexible rubber material.

11. The improvement of claim 10, wherein the flexible rubber material is selected from the group consisting of nitrile rubber and silicone rubber.

* * * * *